(12) United States Patent
Tatarinov et al.

(10) Patent No.: US 10,315,708 B2
(45) Date of Patent: Jun. 11, 2019

(54) DASHBOARD SUPPORT FOR HOLDING AN ATTACHMENT IN A MOTOR VEHICLE

(71) Applicant: Benteler Automobiltechnik GmbH, Paderborn (DE)

(72) Inventors: Konstantin Tatarinov, Bielefeld (DE); Jiri Štech, Chrastava (CZ); Robert Stockter, Hannover (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 280 days.

(21) Appl. No.: 15/341,531

(22) Filed: Nov. 2, 2016

(65) Prior Publication Data
US 2017/0120957 A1    May 4, 2017

(30) Foreign Application Priority Data

Nov. 4, 2015    (DE) .......................... 10 2015 118 899

(51) Int. Cl.
| | | |
|---|---|---|
| *B62D 25/14* | (2006.01) | |
| *B62D 27/02* | (2006.01) | |
| *B62D 29/00* | (2006.01) | |

(52) U.S. Cl.
CPC ........... *B62D 25/145* (2013.01); *B62D 27/02* (2013.01); *B62D 29/007* (2013.01); *B60Y 2304/05* (2013.01); *B60Y 2410/124* (2013.01)

(58) Field of Classification Search
CPC .............................. B62D 25/145; B62D 27/02
See application file for complete search history.

(56) References Cited

U.S. PATENT DOCUMENTS

| 6,988,764 | B2 * | 1/2006 | Matsutani | ............ | B62D 25/142 |
| | | | | | 180/90 |
| 8,485,590 | B2 * | 7/2013 | Maurer | ................ | B62D 29/008 |
| | | | | | 296/193.02 |
| 2017/0120956 | A1 * | 5/2017 | Trannoy | ................. | B62D 27/02 |

FOREIGN PATENT DOCUMENTS

| CA | 2736845 | A1 * | 10/2011 | ........... | B62D 25/145 |
| DE | 19618626 | A1 | 11/1997 | | |
| DE | 10104790 | A1 | 8/2002 | | |
| DE | 102007038036 | | 2/2009 | | |
| DE | 102012100611 | A1 * | 3/2013 | ........... | B62D 25/145 |
| DE | 202017104178 | U1 * | 8/2017 | ............. | B32B 15/08 |
| EP | 2716526 | A1 * | 4/2014 | ........... | B62D 25/145 |
| EP | 1529720 | B2 * | 9/2014 | ............. | B62D 25/14 |
| FR | 2861682 | A1 * | 5/2005 | ............. | B62D 25/14 |
| FR | 3009799 | A1 * | 2/2015 | ............. | B23K 1/002 |
| FR | 3006393 | B1 * | 4/2016 | ........... | B62D 25/145 |
| FR | 3061681 | A1 * | 7/2018 | ............. | B60K 37/04 |
| FR | 3061682 | A1 * | 7/2018 | ............. | B60K 37/04 |
| FR | 3061683 | A1 * | 7/2018 | ............. | B60K 37/04 |

(Continued)

*Primary Examiner* — Hilary L Gutman
(74) *Attorney, Agent, or Firm* — Arash Behravesh; Mannava & Kang, P.C.

(57) ABSTRACT

The invention relates to a dashboard support for holding an attachment by means of a connecting element, which has a fastening leg, in a motor vehicle, having: at least one tubular crossmember having a tube wall, in which a plateau-shaped bulge is formed, wherein the plateau-shaped bulge comprises a mounting section for mounting the connecting element, wherein an aperture for receiving the fastening leg is formed in the tube wall adjacent to the mounting section.

15 Claims, 12 Drawing Sheets

(56) References Cited

FOREIGN PATENT DOCUMENTS

| WO | WO-0154963 A1 | * | 8/2001 | ........... | B62D 25/145 |
| WO | WO-2016104094 A1 | * | 6/2016 | ........... | B62D 25/145 |

* cited by examiner

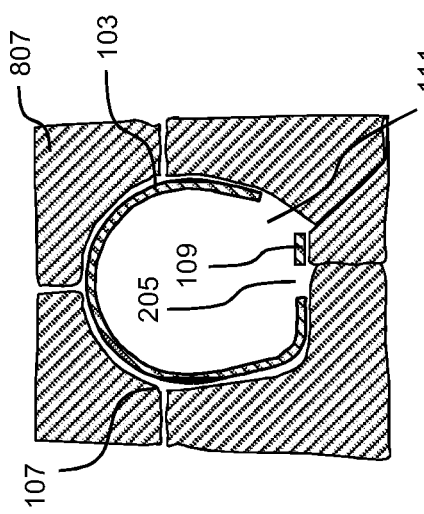
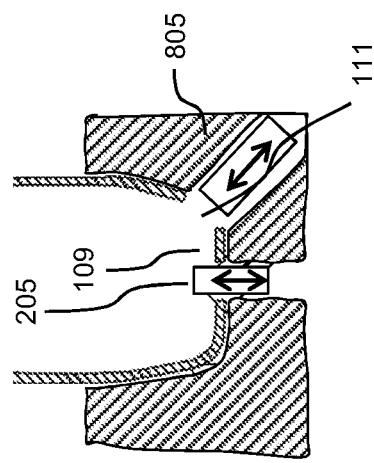
Fig. 8C
Fig. 8D

DASHBOARD SUPPORT FOR HOLDING AN ATTACHMENT IN A MOTOR VEHICLE

PRIORITY

The present application is claims priority to German patent application number 10 2015 118 899.6, having a filing date of Nov. 4, 2015, the disclosure of which is hereby incorporated by reference in its entirety.

TECHNICAL FIELD

The present invention relates to a dashboard support for holding an attachment in a motor vehicle.

BACKGROUND

To hold one or more attachments, e.g. a steering wheel and/or functional components of a cockpit in a motor vehicle, use is made of a dashboard support, which is arranged by means of at least one crossmember between the A pillars of the motor vehicle. To hold the attachments, the crossmember is generally equipped with connecting elements. For this purpose, the crossmember is welded to sheet-metal parts for connecting elements, for example, and the connecting elements are then inserted into the sheet-metal parts, but this is labor-intensive and costly.

DE 10 2007 038 036 B4 discloses a method for producing a crossmember for a dashboard support which is particularly efficient in terms of production and in which the connecting elements, e.g. self-punching nuts, are inserted into a crossmember in a particularly efficient manner in terms of production during the production of said crossmember itself.

SUMMARY OF THE INVENTION

It is the object of the present invention to indicate an alternative dashboard support which can be equipped subsequently with connecting elements in a manner which is efficient in terms of production.

This object is achieved by means of the features of the independent patent claims. Advantageous developments are the subject matter of the dependent claims, the description and the attached figures.

The present invention is based on the insight that the above object can be achieved by a mounting region which is formed by a local deformation of a crossmember of a dashboard support and which is provided for receiving a connecting element. The mounting region can be in the form of an embossed plateau-shaped bulge which extends radially outward and is terminated by a flat mounting section, for example.

The elevation created by the plateau-shaped formation enables the crossmember to be equipped with connecting elements, e.g. clip nuts or fastening bolts, in a simple manner. The advantage that it is possible to dispense with separate sheet-metal parts or formed parts for holding attachments is thereby achieved in a particularly efficient manner in terms of production. On the contrary, the connecting elements are connected directly to the mounting region of the crossmember. Moreover, the dashboard support can be produced in a particularly efficient manner because one or more mounting regions can be formed by embossing the crossmember during the production of the crossmember. The tool that can be used for this purpose can be implemented in a particularly advantageous way because it is possible to dispense with joining tools, and thermal welding distortions are avoided. The plateau-shaped bulge can be embossed outward by means of a pressing punch, for example, and therefore complex internal tools, such as expanding mandrels, are not required.

According to a first aspect, the invention relates to a dashboard support for holding an attachment by means of a connecting element, which has a fastening leg, in a motor vehicle, having at least one tubular crossmember having a tube wall, in which a plateau-shaped bulge is formed, wherein the plateau-shaped bulge comprises a mounting section for mounting the connecting element, wherein an aperture for receiving the fastening leg is formed in the tube wall adjacent to the mounting section.

The dashboard support can be formed from a tubular crossmember. However, it can also be formed in several parts, that is to say, in particular, can comprise a further tubular crossmember. In the case of a multipart embodiment, the dashboard support can comprise a plurality of tubular crossmembers, which are assembled axially.

The tubular crossmember can be formed from a steel sheet formed into an O shape, for example, and can have a circular cross section, although this can be flattened at certain locations. The plateau-shaped bulge is formed in the tube wall of the crossmember, wherein the tube wall is deformed radially outward. The inner wall of the tube wall is deformed in a complementary way in the region of the plateau-shaped bulge. As a result, the plateau-shaped bulge forms both the externally accessible mounting section for receiving the connecting element and a cavity underneath the mounting section resulting from the embossing of the tube wall, which cavity can receive the fastening leg of the connecting element, for example. A defined attachment point for the insertion of the connecting element into the crossmember is thereby created in an advantageous manner.

According to one embodiment, the mounting section is flattened. The flattened mounting section forms the termination of the plateau-shaped bulge, for example, and enables a flat region, e.g. that of a supporting strap or of a supporting leg of the connecting element, to be supported. The flattened mounting section forms a mounting plane for mounting the connecting element.

According to one embodiment, the aperture is formed in a side wall of the plateau-shaped bulge, in particular by a slotted hole. The side wall of the plateau-shaped bulge is entailed by the bulging process and the vertical displacement of the mounting section and connects a tube wall region that is not bulged and surrounds the plateau-shaped bulge to the mounting section. By means of the aperture formed in the side wall of the plateau-shaped bulge, a defined attachment point for the connecting element is provided. Thus, the fastening leg of the connecting element can be introduced into the aperture, i.e. into the interior of the tubular crossmember underneath the mounting section. If the connecting element is a clip nut having the fastening leg, for example, said nut can be positioned or fastened on the crossmember by pushing the fastening leg into the aperture.

According to one embodiment, a transverse slot is formed in the tube wall, which slot pierces the tube wall between the mounting section and a section of the tube wall, wherein a transverse slot edge away from the mounting section is lower than a transverse slot edge toward the mounting section, and wherein the aperture is formed between the transverse slot edge toward the mounting section and the transverse slot edge away from the mounting section. The transverse slot edge toward the mounting section is the transverse slot edge situated nearer the mounting section. Similarly, the transverse slot edge away from the mounting section is the transverse slot edge situated further away from the mounting section. The aperture can be formed by pressing in a transverse slot edge, for example, in particular during or directly following a cutting operation of the transverse slot.

According to one embodiment, the tube section is pressed in at the transverse slot edge away from the mounting section or has a depression in order to bring about a difference in height between the transverse slot edges. The transverse slot edge away from the mounting section can be pressed in radially in the direction of the interior of the crossmember, for example, giving rise to the difference in height between the transverse slot edges which forms the aperture for receiving the fastening leg. It is thereby possible to implement the aperture in a particularly simple manner.

According to one embodiment, the transverse slot edge toward the mounting section can be gripped by the connecting element, which can be hoop-shaped. This is a particularly advantageous way of ensuring that the connecting element can be positioned on the mounting section, while the fastening leg is arranged underneath the mounting section. If the mounting section forms a flattened mounting plane, the connecting element can be fastened on the mounting section simply by pushing the fastening leg into the aperture.

According to one embodiment, the transverse slot is delimited by opposite holes or openings. The opposite openings or holes advantageously ensure that the transverse slot does not tear apart as the transverse slot edge away from the mounting section is pressed in and that the cross-sectional length is defined.

According to one embodiment, a further aperture, in particular a slotted hole, for receiving a fastening bolt is formed in the mounting section. The further aperture can be formed centrally in the mounting section, for example, and can be provided, for example, to receive a fastening bolt that can pass through the mounting section.

According to one embodiment, the fastening leg passes through the aperture. A crossmember prefabricated with the connecting element or with a plurality of connecting elements is thereby provided in a particularly advantageous manner.

According to one embodiment, the connecting element has a further fastening leg, which rests on the mounting section and locks the fastening leg positively in the aperture. The fastening leg introduced into the aperture can have a web which permits the positive locking in the aperture, for example. The fastening leg and the further fastening leg can form a spring fastening clip, thereby allowing the positive locking of the further fastening leg in the aperture to be effected.

According to one embodiment, the invention relates to the dashboard support having an attachment or a holder for the attachment, wherein the attachment or the holder is connected to the connecting element. The attachment or holder can be connected to the connecting element by means of a screw, for example. The holder can thereby be connected to the crossmember in a particularly efficient manner.

According to one embodiment, the crossmember can be arranged or fastened between opposite A pillars of a motor vehicle.

According to a second aspect, the invention relates to a method for producing a dashboard support, on which a connecting element can be fastened by means of a fastening leg, comprising: provision of a sheet-metal blank, forming the sheet-metal blank to give a semifinished sheet-metal product having a U-shaped cross section, embossing a plateau-shaped bulge having a mounting section for mounting the connecting element in a base region of the formed semifinished sheet-metal product, forming a receiving opening for receiving the fastening leg in a position adjacent to the mounting section, and forming the semifinished sheet-metal product to give a tubular crossmember. The crossmember is thus formed by the U-O forming of the sheet-metal blank or tailored sheet-metal blank. The plateau-shaped bulge and the receiving opening can be implemented in one production step, for example.

The dashboard support according to the invention can optionally be formed from a plurality of tubular crossmembers, wherein only one of the crossmembers is formed by the U-O forming operation, for example. A further crossmember can axially adjoin this U-O-formed crossmember in the direction of an A pillar.

According to one embodiment, the embossing of the plateau-shaped bulge having the mounting section and the punching of the receiving opening are carried out in one production step by means of a pressing tool. The pressing tool can, for example, have a pressing punch which makes possible the bulge, the mounting section and the punching of the receiving opening in one production step. For this purpose, the pressing punch can press the semifinished sheet-metal product against a pressing die in which the negative of the plateau-shaped bulge is formed.

According to one embodiment, the invention relates to the method comprising: the formation of a further receiving opening in the mounting section. The further receiving opening can be formed in the step of producing the plateau-shaped bulge, e.g. by means of a combined embossing and perforating punch.

According to one embodiment, the perforating step can be decoupled from the embossing step.

According to one embodiment, the invention relates to the method comprising: introduction of the fastening leg of the connecting element into the aperture in order to mount the connecting element on the mounting section. The connecting element is thus inserted into the tubular crossmember after the production thereof.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

Further illustrative embodiments of the present invention are explained in greater detail with reference to the attached figures, of which:

FIGS. 8A, 8B, 8C and 8D show steps of a method for producing the dashboard support according to the invention.

It is to be understood that both the foregoing general description and the following detailed description are exemplary and explanatory only, and are intended to provide an explanation of various embodiments of the present teachings.

DETAILED DESCRIPTION

Figure 1:
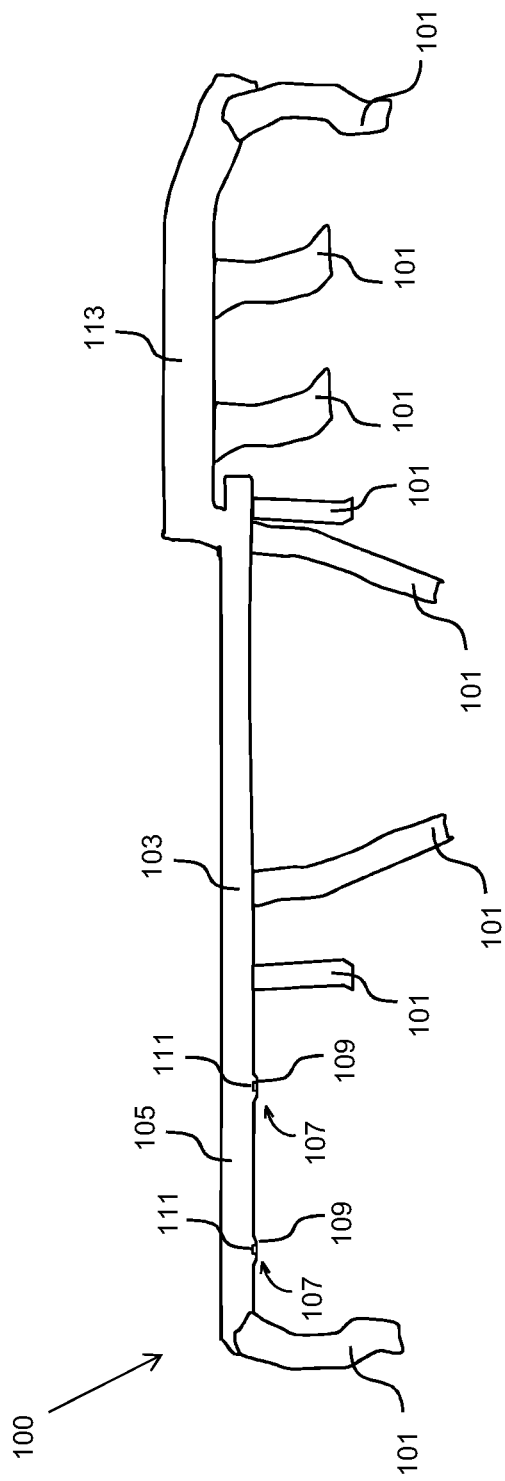
FIG. 1 shows a dashboard support having a crossmember according to one embodiment.

FIG. 1 shows a dashboard support 100 with holders 101 for holding one or more attachments according to one embodiment. The holders 101 are connected in a fixed manner to the crossmembers 103, 113, for example, in particular being welded thereto.

The dashboard support 100 comprises a tubular crossmember 103 having a tube wall 105, in which one or more plateau-shaped bulges 107 are formed.

The respective plateau-shaped bulge 107 is embossed radially outward and comprises a mounting section 109, which provides a mounting plane for mounting a connecting element (not shown in FIG. 1). An aperture 111 for receiving a fastening leg of the connecting element is formed in the tube wall adjacent to the mounting section 109.

The dashboard support 100 can have a further tubular crossmember 113, which has at least one or more plateau-shaped bulges 107, which are provided for mounting connecting elements.

Figure 2A:
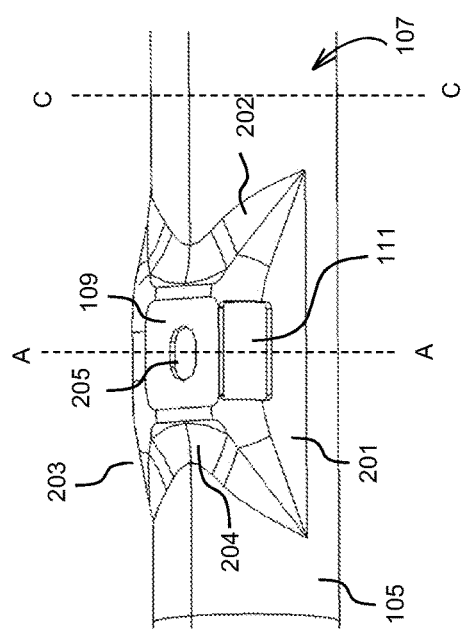
FIG. 2A shows a section of the tube wall of the crossmember.

FIG. 2A shows a section of the tube wall with the plateau-shaped bulge 107. As shown in FIG. 2A, the plateau-shaped bulge 107 is formed by radial embossing or deformation of the tube wall 105. The plateau-shaped bulge comprises side walls 201-204, which extend from the tube wall 105 to the mounting section 109. The mounting section 109 forms a termination of the plateau-shaped bulge 107 and is flattened, thereby forming an externally accessible mounting plane for receiving a connecting element.

The aperture 111 is formed at the side of the mounting section 109 in the side wall 201 and is, for example, in the form of a slotted hole, which can be oval or rectangular with rounded corners. The aperture 111 defines an area which is arranged at an angle to the mounting section 109. In other words, the normal of the plane defined by the aperture 111 is at an angle to a normal of the plane which forms the mounting section, the latter being flattened here. As a result, the fastening clip of the connecting element (not shown in FIG. 2A) can be introduced laterally into the aperture 111, allowing the mounting section to be gripped on both sides. The aperture 111 opens in the direction of a receiving space, which is formed by the bulge in the wall 105 within the crossmember 103.

As explained above, the mounting section can form a flat mounting plane, in which a further aperture 205 is optionally formed. The further aperture 205 is a slotted hole or a round hole or an angular hole, for example, which is formed in the plane of the mounting section 109, i.e. in the mounting plane. The further aperture 205 enables a fastening bolt to be received, for example.

Figure 2B:
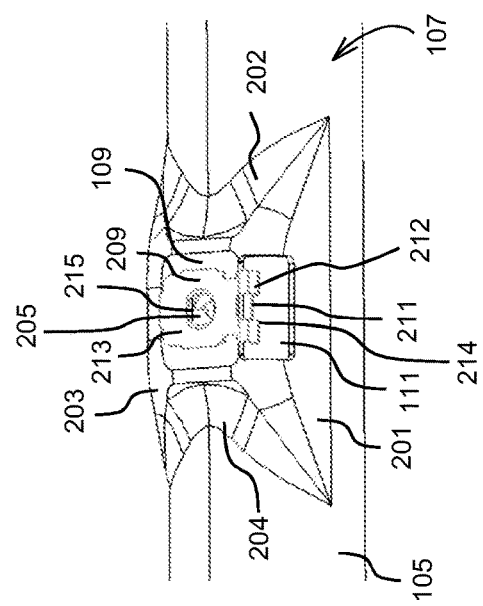
FIG. 2B shows the section of the tube wall of the crossmember.

FIG. 2B shows the detail of the crossmember 103 shown in FIG. 2A with a connecting element 209. The connecting element 209 comprises a fastening leg 211, which is introduced into the aperture 111. The connecting element 209 furthermore comprises a further fastening leg 213, which rests on the mounting section 109. The fastening legs 211, 213 form a fastening clip and grip the mounting section 109 on both sides, thereby mounting and fastening the connecting element 209. The fastening leg 211 can have at least one web 212, 214, which is introduced into the aperture 111.

The fastening leg 211 can furthermore have a collar, which projects in the direction of the aperture 111 and which projects at least partially into the aperture 111 and thereby allows positive and loss-proof holding of the fastening leg 211.

The connecting element 209 can furthermore have an opening 215, which is in alignment with the further opening 205 in the mounted state. This enables a bolt (not shown in FIG. 2B) to pass through the openings 215 and 205, thereby enabling one of the holders 101 to be fastened on the crossmember 103.

Figure 3:
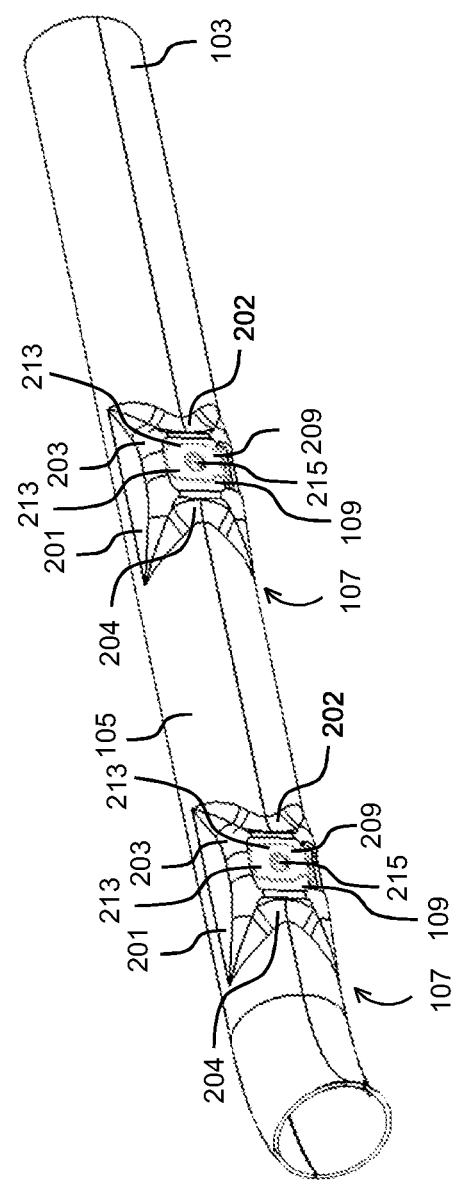
FIG. 3 shows the crossmember with connecting elements inserted.

The plateau-shaped bulge shown in FIGS. 2A and 2B can have a rectangular base cross section and can taper toward the mounting section 109. The side walls 201, 202, 203 and 204 can therefore slope toward the mounting section 109. For example, the plateau-shaped bulge 107 extends in a pyramid shape toward the mounting section 109. FIG. 3 shows the tubular crossmember 103 with connecting elements 209 inserted as explained above. As illustrated in FIG. 3, the plateau-shaped bulges 107 are formed by deformations of the tube wall 105. Here, the tube wall 105 is in each case embossed outward. The respective plateau-shaped bulge 107 and the tubular crossmember 103 are thus formed integrally and form a one-piece shaped part.

The aperture 111 can be formed by punching or stamping, for example. By way of example, the aperture 111 shown in FIGS. 2A and 2B is formed transversely to a longitudinal direction of the crossmember 103 and transversely to a longitudinal axis of the crossmember 103. However, the aperture 111 can also be formed in the longitudinal direction of the crossmember 103, e.g. in the side wall 202 or 204.

According to one embodiment, a plateau-shaped bulge 107 can be formed for holding two or more connecting elements 209. For this purpose, the plateau-shaped bulge 107 can have four or more apertures, e.g. two apertures 111, in different, e.g. adjacent side walls 201, 202, 203 and 204, and two apertures 205 in the mounting section 109, which are aligned at an angle to one another, for example. Thus, each of the connecting elements 109 can be fastened from a different side of the plateau-shaped bulge 107.

Figure 4A:
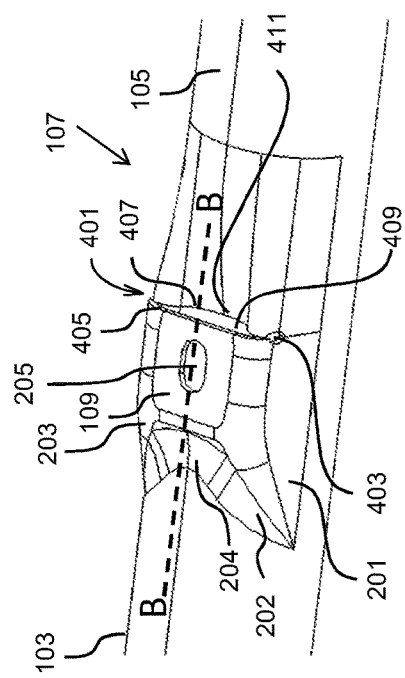
FIG. 4A shows the crossmember according to another embodiment.

FIG. 4A shows the crossmember 103 with the plateau-shaped bulge 107 according to another embodiment.

In contrast to the embodiment of the plateau-shaped bulge 107 shown in FIGS. 1A and 1B, a transverse slot 401 is formed in the tube wall 105, said transverse slot being delimited on both sides by openings 403. Adjacent to the mounting section 109, the transverse slot 401 is formed with a first transverse slot edge 405 and a second transverse slot edge 407. The first transverse slot edge 405 is toward the mounting section 109, while the second transverse slot edge 407 is away from the mounting section 109.

The transverse slot edges 405, 407 are moved apart, thereby forming the aperture 409. Aperture 409 has the same function as aperture 111 and serves to receive the fastening leg of the connecting element.

As shown in FIG. 4A, the second transverse slot edge 407 is formed by pressing down the tube wall 105 relative to the mounting section 109. This gives rise in the tube wall 105 to a depression 411, which forms a radial deformation of the tube wall 105 in the direction of the interior of the crossmember 103. As a result, the second transverse slot edge 407 is pressed in radially, with the result that the first transverse slot edge 405 and the second transverse slot edge 407 are in different planes or at different levels relative to a longitudinal axis of the crossmember 103, thereby forming aperture 409. Aperture 409 is arranged laterally and faces in the longitudinal direction of the crossmember 403 according to one embodiment.

According to one embodiment, aperture 409 is formed by pressing in the side wall 202 after the embossing of the plateau-shaped bulge 107. According to another embodiment, the side wall 202 has not yet been bulged outward in the step of embossing the plateau-shaped bulge 107.

The rectangular cross section of the plateau-shaped bulge 107 is furthermore clearly visible in FIG. 4A.

Figure 4B:
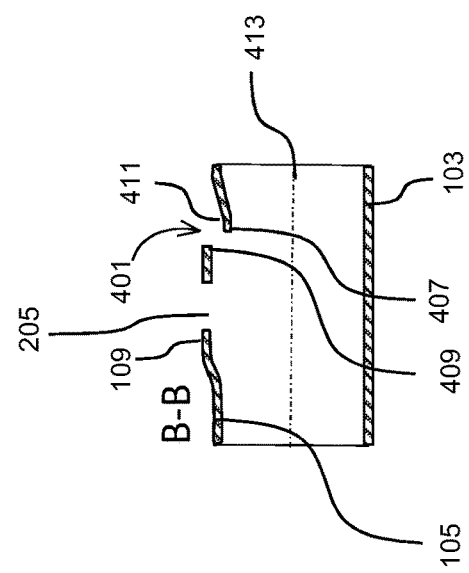
FIG. 4B shows a cross section through the crossmember from FIG. 4A.

FIG. 4B shows a cross section through the crossmember 103 along the section B-B shown in FIG. 4A. As shown in FIG. 4B, the plateau-shaped bulge 107 is formed radially from a central longitudinal axis 413 of the crossmember 103. The depression 411 is pressed radially inward in the direction of the central longitudinal axis 413, for example.

Figure 4C:
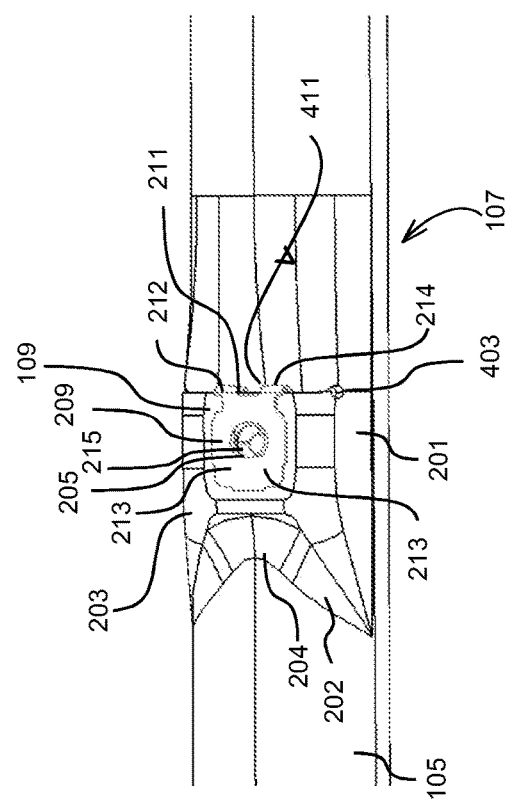
FIG. 4C shows the crossmember from FIG. 4A with a connecting element.

FIG. 4C shows the bulge 107 shown in FIG. 4A with the connecting element 209 inserted. The fastening leg 211 of the connecting element 209 has been introduced into the lateral receiving opening 409. This can be accomplished by pushing the fastening leg 211 into aperture 409 in the longitudinal direction of the crossmember 103.

The fastening leg 211 can be connected by means of one or more webs 212, 214 to the further fastening leg 213 resting on the mounting region 109, thereby giving rise to a spring clip which grips the mounting section 109 on both sides.

Figure 5:
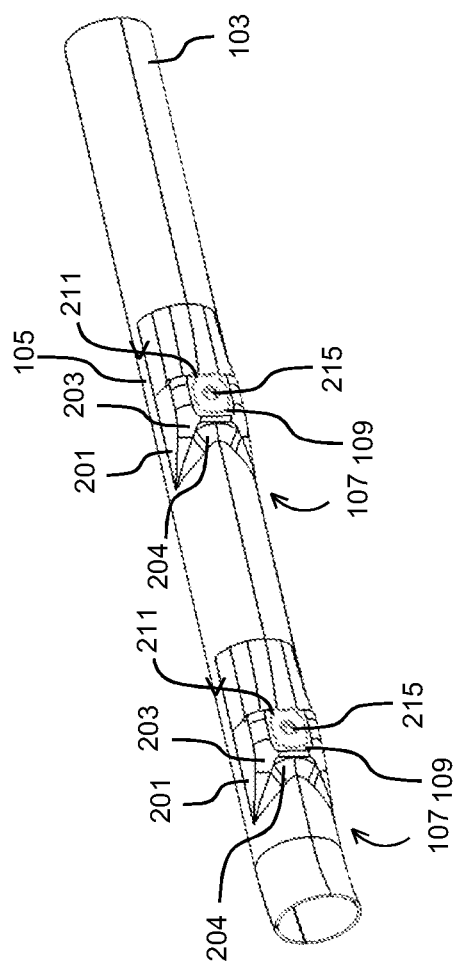
FIG. 5 shows the crossmember from FIG. 4A with a plurality of plateau-shaped bulges.

FIG. 5 shows the crossmember 103 with a plurality of plateau-shaped bulges according to the embodiment shown in FIG. 4A, into each of which a connecting element 209 has been introduced or inserted. As shown in FIG. 5, the plateau-shaped bulges 107 are arranged aligned in series. However, the bulges 107 can be turned relative to one another, so that the mounting sections 109 face in different directions. Attachment points for holders or attachments can thereby be implemented in different planes in a particularly efficient manner.

Figure 6B:
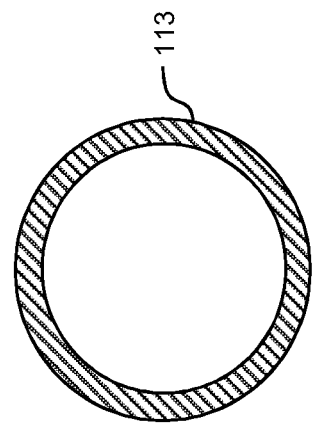
FIG. 6B shows a cross section of the further crossmember from FIG. 1.
Figure 6A:
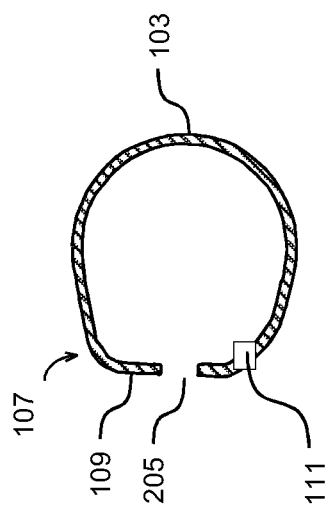
FIG. 6A shows a cross section of the crossmember from FIG. 1.

A cross section of crossmember 103 along the section A-A shown in FIG. 1 is illustrated by way of example in FIG. 6A. FIG. 6B, in contrast, shows a cross section of crossmember 113 along the section C-C. As shown in FIGS. 6A and 6B, the tube walls of the cross members 103, 113 are different. In particular, the tube wall 105 of crossmember 103 is of thinner configuration than the tube wall 113 of crossmember 113. It is thereby possible to implement locally different stiffness levels of the dashboard support 100. According to one embodiment, however, the tube walls of the crossmembers 103, 113 can have the same thickness.

Figure 7:
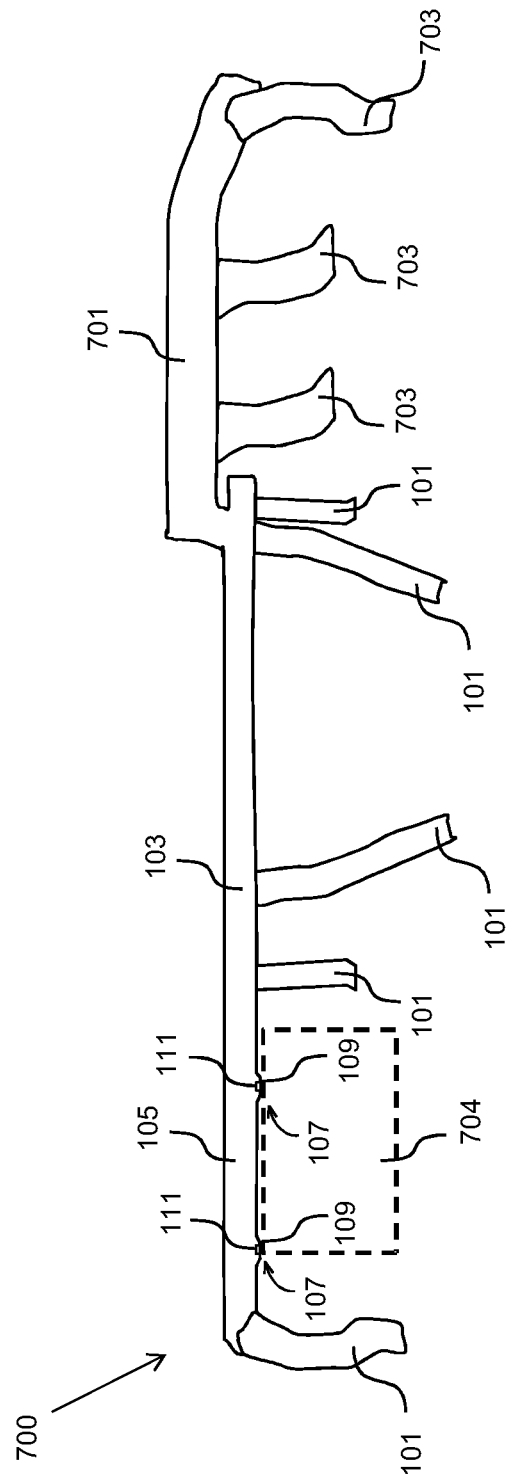
FIG. 7 shows a dashboard support according to another embodiment.

FIG. 7 shows a dashboard support 700 according to another embodiment, in which crossmember 103 merges into a further crossmember 701 or adjoins a further crossmember 701. Crossmember 701 has a smaller diameter than crossmember 103.

There can be a joining zone between crossmembers 103 and 701.

Further holders 703 for holding one or more attachments are fastened on crossmember 701. For this purpose, crossmember 701 can have plateau-shaped bulges 107, which are not shown in FIG. 7. The holders 703 can be fastened on crossmember 701 by means of the connecting elements described above. However, the holders 703 can be welded to crossmember 701.

According to one embodiment, an attachment 704 can be connected directly to the plateau-shaped bulges 107 by means of the connecting elements described above.

Steps of a method for producing the dashboard support according to the invention are shown in FIGS. 8A, 8B, 8C and 8D, for example. As illustrated schematically in FIG. 8A, a sheet-metal blank 801 having side walls 801-1, 801-2 is first of all formed to give a semifinished sheet-metal product having a U-shaped cross section. For this purpose, a pressing tool 803, 805 can be used. The pressing tool 805 can be a single part or can be in multiple parts.

Figure 8B:
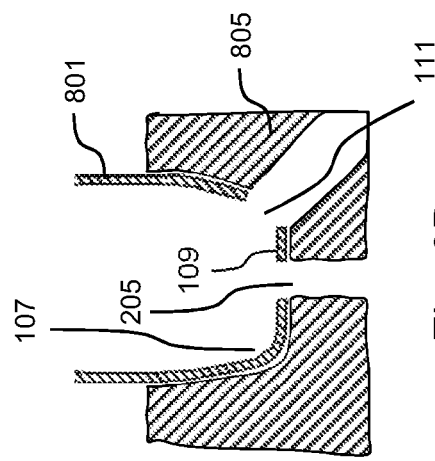
Figure 8A:
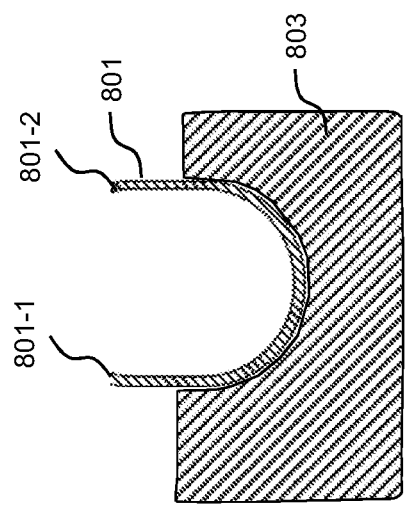

In a further method step, which is shown schematically in FIG. 8B, the plateau-shaped bulge 107 is embossed in the formed sheet-metal blank by means of a further pressing tool 805. During this process, the flattened mounting section 109 is stamped and the aperture 205 in the base region is punched out. Optionally, aperture 111 can be punched in the side wall region of the semifinished sheet-metal product, as shown schematically in FIG. 8C. In a further production step, the semifinished sheet-metal product is formed to give the tubular crossmember 103. According to one embodiment, crossmember 103 is thus produced by U-O forming of the sheet-metal blank 801, wherein the side walls 801-1, 801-2 are joined together. In this process, the plateau-shaped bulge 107 with its features can be can be implemented in one method step during the deformation of the sheet-metal blank. The formation of the plateau-shaped bulge 107 can be accomplished by radial forming of the sheet-metal blank 801.

In a further, optional method step, the mounting section 109 can be connected positively to a connecting element by means of the apertures 111, 205.

The arrangements illustrated in FIGS. 8A-8D of the pressing tools 805, 807 can be turned through 180°. This enables punched-out sheet-metal parts to fall out more easily.

LIST OF REFERENCE SIGNS 100 dashboard support
101 holder
103 tubular crossmember
105 tube wall
107 plateau-shaped bulge
109 mounting section
111 aperture
113 tubular crossmember
201 side wall
202 side wall
203 side wall
204 side wall
205 aperture
209 connecting element
211 fastening leg
212 web
213 fastening leg
214 web
215 opening
401 transverse slot
403 hole 405 first transverse slot edge
407 second transverse slot edge
409 aperture
411 depression
413 central longitudinal axis
700 dashboard support
701 crossmember
703 holder
704 attachment
801 sheet-metal blank
801-1 side wall
801-2 side wall
803 pressing tool
805 pressing tool
807 pressing tool From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

The invention claimed is:

1. A dashboard support comprising:
a connecting element that includes a first fastening leg, in a motor vehicle; and
at least one tubular cross-member having a tube wall, in which a plateau-shaped bulge is formed, wherein the plateau-shaped bulge comprises a mounting section configured to receive the connecting element, wherein the tube wall adjacent to the mounting section includes an aperture that is configured to receive the first fastening leg.

2. The dashboard support as claimed in claim 1, wherein the mounting section is flattened or forms a mounting plane.

3. The dashboard support as claimed in claim 1, wherein the aperture is formed in a side wall of the plateau-shaped bulge.

4. The dashboard support as claimed in claim 1, wherein the tube wall includes a transverse slot having a transverse slot edge away from the mounting section and a transverse slot edge toward the mounting section,
wherein the transverse slot pierces the tube wall between the mounting section and a section of the tube wall,
wherein the transverse slot edge away from the mounting section is lower than the transverse slot edge toward the mounting section, and
wherein the aperture is formed between the transverse slot edge toward the mounting section and the transverse slot edge away from the mounting section.

5. The dashboard support as claimed in claim 1, wherein the tube wall includes a section that (a) is pressed in at the transverse slot edge away from the mounting section or (b) has a depression.

6. The dashboard support as claimed in claim 4, wherein the transverse slot edge toward the mounting section is configured to be gripped by the connecting element.

7. The dashboard support as claimed in claim 4, wherein the transverse slot is delimited by opposite openings.

8. The dashboard support as claimed in claim 1, wherein the mounting section further includes an aperture.

9. The dashboard support as claimed in claim 1, wherein the connecting element is one of a snap nut and a clip nut.

10. The dashboard support as claimed in claim 1, wherein the connecting element comprises a second fastening leg configured to rest on the mounting section and to positively lock the first fastening leg in the aperture.

11. The dashboard support as claimed in claim 1, comprising one of an attachment and an attachment holder, wherein the one of the attachment and the attachment holder is configured to connect to the connecting element.

12. The dashboard support as claimed in claim 1, wherein the cross-member is arranged between opposite A-pillars of a motor vehicle.

13. The dashboard support as claimed in claim 1, wherein the aperture is a slotted hole.

14. The dashboard support as claimed in claim 8, wherein the aperture is configured to receive a fastening bolt.

15. The dashboard support as claimed in claim 1, wherein the first fastening leg is configured to passes through the aperture.

* * * * *